US009681002B2

(12) United States Patent
Neubacher

(10) Patent No.: US 9,681,002 B2
(45) Date of Patent: Jun. 13, 2017

(54) IMPROVING CHARGING INFORMATION ACCURACY IN A TELECOMMUNICATIONS NETWORK

(71) Applicant: T-MOBILE INTERNATIONAL AUSTRIA GMBH, Vienna (AT)

(72) Inventor: Andreas Neubacher, Korneuburg (AT)

(73) Assignee: T-MOBILE INTERNATIONAL AUSTRIA GMBH, Vienna (AT)

( * ) Notice: Subject to any disclaimer, the term of this patent is extended or adjusted under 35 U.S.C. 154(b) by 0 days.

(21) Appl. No.: 14/652,141

(22) PCT Filed: Dec. 10, 2013

(86) PCT No.: PCT/EP2013/076108
§ 371 (c)(1),
(2) Date: Jun. 15, 2015

(87) PCT Pub. No.: WO2014/095493
PCT Pub. Date: Jun. 26, 2014

(65) Prior Publication Data
US 2015/0373203 A1     Dec. 24, 2015

(30) Foreign Application Priority Data

Dec. 17, 2012   (EP) .................................... 12008370

(51) Int. Cl.
*H04M 15/00*    (2006.01)
*H04L 12/24*    (2006.01)
(Continued)

(52) U.S. Cl.
CPC ........ *H04M 15/60* (2013.01); *H04L 12/1435* (2013.01); *H04L 41/5029* (2013.01);
(Continued)

(58) Field of Classification Search
CPC ....... H04M 15/60; H04W 36/08; H04W 4/24; H04L 43/0835; H04L 41/5029; H04L 12/1435; H04L 41/5067
See application file for complete search history.

(56) References Cited

FOREIGN PATENT DOCUMENTS

EP          1341342 A1      9/2003

OTHER PUBLICATIONS

Huawei: "Data Volume Report function in SAE/LTE", 3GPP Draft; R3-071091, 3$^{rd}$ Generation Partnership Project (3GPP), Mobile Competence Centre; 650, Route des Lucioles; F-06921 Sophia-Antipolis Cedex; France, vol. RAN WG3, No. Kobe, Japan; May 14, 2007, May 14, 2007 (May 14, 2007), XP050161964.

(Continued)

*Primary Examiner* — Thai Nguyen
(74) *Attorney, Agent, or Firm* — Leydig, Voit & Mayer, Ltd.

(57) ABSTRACT

A method for improving charging information accuracy in a telecommunications network with respect to a target user equipment includes: in case of a handover or cell change procedure from a first base transceiver station to a second base transceiver station regarding the target user equipment, transmitting first non-delivered packet data volume information from the first base transceiver station to the second base transceiver station using at least one of the following: an X2 interface between the first base transceiver station and the second base transceiver station, an S1 interface between the first base transceiver station and the core network and the S1 interface between the core network and the second base transceiver station, and user equipment history information regarding the target user equipment; and determining, based on the first non-delivered packet data volume information, the second non-delivered packet data volume information.

10 Claims, 1 Drawing Sheet

(51) Int. Cl.
*H04L 12/14* (2006.01)
*H04L 12/26* (2006.01)
*H04W 4/24* (2009.01)
*H04W 36/08* (2009.01)

(52) U.S. Cl.
CPC .......... *H04L 43/0835* (2013.01); *H04W 4/24* (2013.01); *H04W 36/08* (2013.01); *H04L 41/5067* (2013.01)

(56) References Cited

OTHER PUBLICATIONS

NEC: "Data Volume Reporting in Intra HNB-GW Mobility", 3GPP Draft; R3-092028, 3rd Generation Partnership Project; (3GPP), Mobile Competence Centre; 650, Route des Lucioles; F-06921 Sophia-Antipolis Cedex; France, No. Shenzhen, China; Aug. 24, 2009, Aug. 24, 2009 (Aug. 24, 2009), XP050391586.

IMPROVING CHARGING INFORMATION ACCURACY IN A TELECOMMUNICATIONS NETWORK

CROSS-REFERENCE TO RELATED APPLICATIONS

This application is a U.S. National Phase application under 35 U.S.C. §371 of International Application No. PCT/EP2013/076108, filed on Dec. 10, 2013, and claims benefit to European Patent Application No. EP 12008370.4, filed on Dec. 17, 2012. The International Application was published in English on Jun. 26, 2014 as WO 2014/095493 under PCT Article 21(2).

FIELD

The present invention relates to a method for improving charging information accuracy in a telecommunications network, especially a public land mobile network. The charging information accuracy is enhanced on a user equipment specific basis, i.e. individually with respect to a user equipment, hereinafter also called target user equipment.

Furthermore, the present invention relates to a base transceiver station that is enabled, in case of a handover or a cell change to another base transceiver station, to transmit information regarding charging information which is specific to the target user equipment and preferably specific to a data connection established between the telecommunications network and the target user equipment to the other base transceiver station a base transceiver station that is enabled, in case of a handover or a cell change from another base transceiver station, to receive information regarding charging information which is specific to the target user equipment and preferably specific to a data connection established between the telecommunications network and the target user equipment from the other base transceiver station.

Additionally, the present invention relates to a telecommunications network for improving charging information accuracy with respect to a target user equipment.

BACKGROUND

The exchange of packetized information in a wireless communication system has already grown dramatically and probably will also grow in the future. In some wireless telecommunications networks, it is important to track or monitor the volume of exchanged packet data and/or measure the bandwidth utilization of the packet data network and/or the telecommunications network. Where such measures are important to charging or billing a user, it is important to generate charging information as accurately as possible. Additionally, the regulatory environment in telecommunication and consumer affair organisations, are introducing increased requirements on accuracy of charging of data usage of end customers.

In an Internet Protocol based environment, respectively in Internet Protocol networks, data packets may be discarded at various network elements because of either overload situations in routers, gateways etc. and/or because of congestions on transport channels/media interconnecting these network elements. There exist packet exchange protocols and associated systems—e.g. standard TCP/IP protocol-based systems provide for accurate monitoring of and charging for data exchanged through a communications system—that provide for a verification of the packet data exchanged between two points of an Internet Protocol network that would enable the generation of accurate charging information. However, such reliable protocols impose significant overhead as compared to, for example, UDP (User Datagram Protocol) or other packet oriented protocols. Such unreliably protocols are used according to the 3GPP standards (i.e. the standards of the third generation partnership project) in mobile communication systems and hence, it is a problem for such systems to accurately charge a user for utilization of the network for data transfers.

In fixed networks, discarding of packets can be avoided or kept negligible by proper dimensioning of network equipment and transport line dimensioning. In the context of mobile telecommunications networks, e.g. cellular networks, discard of packets is most likely to happen at the termination points of the air interfaces, due to the unreliable and varying nature of the air interface. Since temporary congestion situations are originated by the unreliable and varying nature of the air interface, packet discard cannot be avoided even by proper dimensioning and configuration.

In mobile telecommunications networks, charging is done usually at hierarchically higher networks nodes like gateways. Therefore, the actual counted volume at a hierarchically higher networks nodes like a gateway, compared to the data volume arriving at the user equipment of the customer may be less, due to intermediate network equipment discarding data packets temporarily.

For 3G networks (third generation networks, especially UMTS (Universal Mobile Telecommunications System) networks), a solution to report the unsuccessfully transmitted down link user plane data volume is described in 3GPP TS 25.413. The solution can be sketched as follows:

The radio network controller (RNC) is the central element in the radio network, and furthermore the termination point of the air interface radio protocols.

Thus even in case of mobility of a user, i.e. in case the user changes from one base station (NodeB) to another, the dataflow has to pass through the radio network controller.

Therefore the radio network controller is the most suitable place to collect/count the number of undelivered/discarded packets, associated with certain bearers and allocated to a specific user equipment.

The core network may request a report about the number of unsuccessfully transmitted down link user plane data volume from the radio network controller.

However, for radio network architectures with distributed base transceiver stations where the air interface terminates directly in the base transceiver stations such as the LTE system (Long Term Evolution), no such solution for providing improved charging information accuracy exists.

SUMMARY

In an embodiment, the invention provides a method for improving charging information accuracy in a telecommunications network with respect to a target user equipment. The telecommunications network comprises a core network, a first base transceiver station and a second base transceiver station. The target user equipment receives data traffic from the core network in the form of data packets, the data traffic being related to a data connection established between the target user equipment and the telecommunications network. In case that the target user equipment camps on the telecommunications network using the first base transceiver station, the first base transceiver station comprises a first non-delivered packet data volume information, the first non-delivered packet data volume information being specific to the target user equipment and related to data packets to be sent to the target user equipment but unsuccessfully transmitted to the target user equipment. In case that the target user equipment camps on the telecommunications network using the second base transceiver station, the second base transceiver station comprises a second non-delivered packet data volume information, the second non-delivered packet data volume information being specific to the target user equipment and related to data packets to be sent to the target user equipment but unsuccessfully transmitted to the target user equipment. The method comprises: in case of a handover or cell change procedure from the first base transceiver station to the second base transceiver station regarding the target user equipment, transmitting the first non-delivered packet data volume information from the first base transceiver station to the second base transceiver station using at least one of the following: an X2 interface between the first base transceiver station and the second base transceiver station, an S1 interface between the first base transceiver station and the core network and the S1 interface between the core network and the second base transceiver station, and user equipment history information regarding the target user equipment; and determining, based on the first non-delivered packet data volume information, the second non-delivered packet data volume information.

BRIEF DESCRIPTION OF THE DRAWINGS

The present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following.

DETAILED DESCRIPTION

Figure 1:
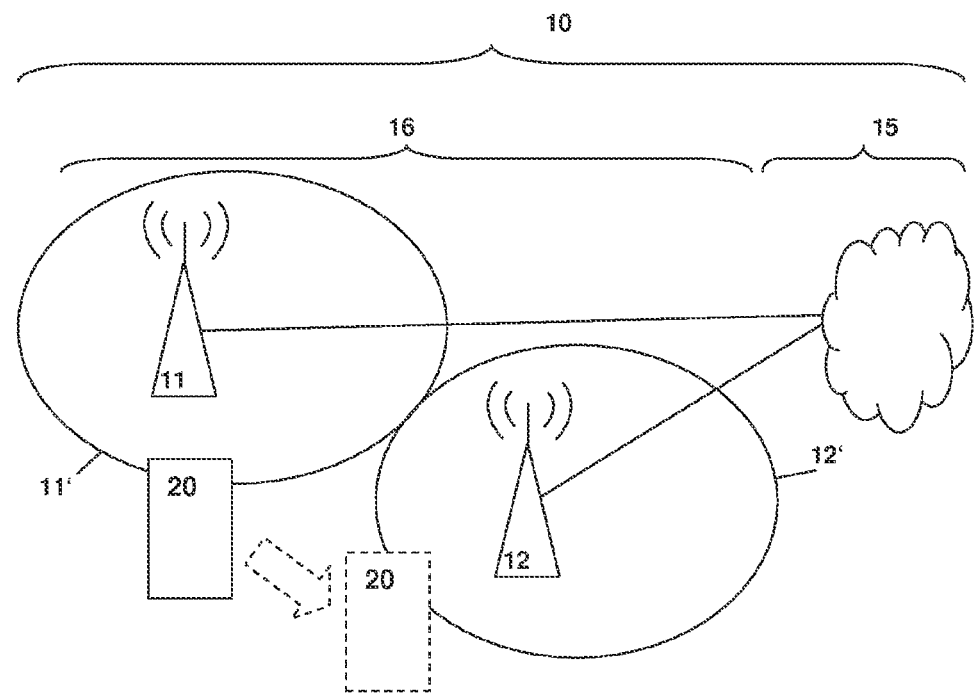
FIG. 1 schematically illustrates a mobile communication network with a first base transceiver station, a second base transceiver station, a core network, and a target user equipment.

In an embodiment, the invention provides a technically simple, effective and cost effective solution for improving charging information accuracy in a telecommunications network with respect to a target user equipment.

In an embodiment, the invention provides a corresponding base transceiver station, as well as a telecommunications network.

In an embodiment, the invention provides a method for improving charging information accuracy in a telecommunications network with respect to a target user equipment, wherein the telecommunications network comprises a core network, a first base transceiver station and a second base transceiver station, wherein the target user equipment receives data traffic from the core network in the form of data packets, the data traffic being related to a data connection established between the target user equipment and the telecommunications network, wherein in case that the target user equipment camps on the telecommunications network using the first base transceiver station, the first base transceiver station comprises a first non-delivered packet data volume information, the first non-delivered packet data volume information being specific to the target user equipment and related to data packets to be sent to the target user equipment but unsuccessfully transmitted by the first base transceiver station to the target user equipment, wherein in case that the target user equipment camps on the telecommunications network using the second base transceiver station, the second base transceiver station comprises a second non-delivered packet data volume information, the second non-delivered packet data volume information being specific to the target user equipment and related to data packets to be sent to the target user equipment but unsuccessfully transmitted by the second base transceiver station to the target user equipment, wherein in case of a handover or cell change procedure from the first base transceiver station to the second base transceiver station regarding the target user equipment, the first non-delivered packet data volume information is transmitted from the first base transceiver station to the second base transceiver station and is taken into account for determining the second non-delivered packet data volume information, the first non-delivered packet data volume information being transmitted by means of using at least one out of the following:

an X2 interface between the first base transceiver station and the second base transceiver station, an S1 interface between the first base transceiver station and the core network and the S1 interface between the core network and the second base transceiver station, user equipment history information regarding the target user equipment.

It is thereby advantageously possible according to the present invention to count and consolidate the undelivered data packet volume regarding the target user equipment in the telecommunications network, i.e. to determine as precisely as possible and in any case more precisely than with methods according to the prior art the volume of undelivered data traffic intended to be delivered to the target user equipment.

The difference between the received data volume at the hierarchically higher networks nodes like gateways towards the packet data network, and the non-delivered packet data volume relates to the actual delivered data volume, and is therefore the chargeable data volume.

This enables the operator and/or the service provider of the telecommunications network to comply with increased regulatory requirements on the accuracy of charging of data usage towards end customers.

The first non-delivered packet data volume information relates to packet data volume being specific to the target user equipment and related to data packets to be sent, by the first base transceiver station, to the target user equipment but unsuccessfully transmitted by the first base transceiver station to the target user equipment.

Likewise, the second non-delivered packet data volume information relates to packet data volume being specific to the target user equipment and related to data packets to be sent, by the second base transceiver station, to the target user equipment but unsuccessfully transmitted by the second base transceiver station to the target user equipment.

In case of a handover of the target user equipment from the first base transceiver station to the second base transceiver station, knowledge of either both the first and second non-delivered packet data volume or of the second non-delivered packet data volume (in case that the second non-delivered packet data volume information comprises or integrates the first non-delivered packet data volume) enables the network to more accurately assess the data volume actually used by the target user equipment. Preferably, the second non-delivered packet data volume information comprises some aggregation, not only of the non-delivered packet data volume related to the second base transceiver station but also related to the first base transceiver station, e.g. the sum of the first non-delivered packet data volume and the second non-delivered packet data volume. In case of a further handover, starting from the second base transceiver station to a further base transceiver station, the second non-delivered packet data volume information has the role of the first non-delivered packet data volume information for this handover.

The present invention is primarily described with respect to a telecommunications network according to the LTE (Long Term Evolution) technology. However the solution is equally applicable for any other radio network architecture without a central termination point for the air interface radio protocols, i.e. for radio networks where the radio protocols terminate directly in the base transceiver station(s).

In a distributed network environment like in telecommunications network according to the LTE technology, unsuccessfully transmitted down link user plane data packets occur in various places (i.e. at various base transceiver stations) in the field, while the user equipment is roaming and/or moving around between different base transceiver stations. This means that in a number of different locations or in a number of different network elements of the telecommunications network, parts of information are located that refer to unsuccessfully transmitted down link user plane data packets with respect to a specific target user equipment.

The present invention provides a solution to collect and aggregate these data and preferably all these data from various different locations in a consistent and efficient manner.

According to the present invention, at a base transceiver station to which the target user equipment is connected by means of a radio link (air interface), the non-delivered packet data volume is detected. This can, e.g., either be provided by means of counting data packets (and, in case of data packets of different size, also detecting the respective aggregated size of non-delivered packet data volume), or by means of detecting and determining the data volume of the non-delivered data packets. The determination of the non-delivered packet data volume can be, e.g., provided on the basis of the data (received by the particular base transceiver station where the target user equipment is camping on) to be forwarded to the target user equipment via the air interface, i.e. the base transceiver station counts the arrived user plane data volume for the target user equipment on the backhaul interface (S1 i/f), and the user plane data volume successfully transmitted on the air interface towards the target user equipment.

By means of a comparison, the data volume of the non-delivered data packets (or the number of the non-delivered packet data packets as well as their (possibly varying size) can be determined by the base transceiver station, i.e. for example, the difference between the user plane data volume arrived on the backhaul and successfully transmitted on the air interface corresponds to the unsuccessfully transmitted down link user plane data volume, subject to be reported in a later stage in order to enhance the charging information accuracy.

According to the present invention, one alternative to transmit the first non-delivered packet data volume information to the second base transceiver station is to add the information about the previously unsuccessfully transmitted down link user plane data volume (i.e. the first non-delivered packet data volume information) in the UE History information, i.e. in the user equipment history information regarding the target user equipment. If supported, the UE history information allows forwarding of information from a source-eNodeB (or first base transceiver station) to the target-eNodeB (or second base transceiver station) in a transparent way, regardless of the hand over type used in LTE.

In (the rather unusual) case of the target user equipment not moving to another base transceiver station, i.e. the target user equipment stays stationary with a single base transceiver station, the non-delivered packet data volume can be determined, and after completion of the packet data session be reported to the core network of the telecommunications network in view of using the information about the non-delivered packet data volume in order to improve the charging information accuracy within the telecommunications network.

However, in case that the target user equipment does move to another base transceiver station, i.e. the target user equipment does not stay stationary with a single base transceiver station, it has to be provided a manner to transmit the information about the non-delivered packet data volume from the source base transceiver station to the destination base transceiver station. In the context of the present invention, the source base transceiver station is designated by the term "first base transceiver station", and the destination base transceiver station is designated by the term "second base transceiver station". Again, for both the first base transceiver station and the second base transceiver station, respectively, the non-delivered packet data volume has to be determined, e.g. in the manner described above, i.e. on the basis of the data received by the first or second base transceiver station to be forwarded to the target user equipment via the air interface, and the user plane data volume successfully transmitted by the first or second base transceiver station on the air interface towards the target user equipment.

According to the present invention, a first non-delivered packet data volume information is indicative of the non-delivered packet data volume detected by the first base transceiver station, and a second non-delivered packet data volume information is indicative of the non-delivered packet data volume detected by the second base transceiver station, such that the first non-delivered packet data volume information is transmitted from the first base transceiver station (i.e. the source base transceiver station of the target user equipment) to the second base transceiver station (i.e. the destination base transceiver station of the target user equipment) and the first non-delivered packet data volume information (or the data volume corresponding to the first non-delivered packet data volume information) is taken into account for the second non-delivered packet data volume information (or for determining the second non-delivered packet data volume information). Thereby, it is advantageously possible to provide for an aggregated information about the non-delivered packet data volume even in case of a plurality of base transceiver stations and a plurality of base transceiver station changes, handovers of the target user equipment and/or cell changes of the target user equipment. By means of this aggregation of the non-delivered packet data volume information, it is possible according to the present invention to provide for a reliable determination of the unsuccessfully transmitted down link user plane data volume for a particular user, and hence to enhance the charging information accuracy.

According to a preferred embodiment of the present invention, the first non-delivered packet data volume information is transmitted as part of:
- a handover request message from the first base transceiver station to the second base transceiver station and/or
- a handover required message from the first base transceiver station to the core network.

Thereby, it is advantageously possible that the first non-delivered packet data volume information is easily and effectively transmitted from the first base transceiver station to the second base transceiver station.

According to a further preferred embodiment of the present invention, data packets to be sent to the target user equipment but unsuccessfully transmitted by the first and/or the second base transceiver station relate to user plane data volume.

Thereby, it is advantageously possible to specifically provide the aggregation of non-delivered packet data volume for such data packets or generally data volume that is typically subjected to charging by the network operator of the telecommunications network towards the customer or end user (subscriber related to the target user equipment).

Furthermore, according to an embodiment of the present invention, it is preferred that the first non-delivered packet data volume information counts the volume of undelivered data packets from the first base transceiver station to the target user equipment, and wherein the second non-delivered packet data volume information counts the volume of undelivered data packets from the second base transceiver station to the target user equipment, wherein the second non-delivered packet data volume information preferably corresponds to or comprises the aggregated data volume of the undelivered data packets from the first base transceiver station to the target user equipment, and the undelivered data packet volume from the second base transceiver station to the target user equipment.

Thereby, it is advantageously possible to easily and effectively aggregate the non-delivered packet data volume.

According to a further preferred embodiment of the present invention, the first non-delivered packet data volume information and the second non-delivered packet data volume information are specific to the data connection established between the telecommunications network and the target user equipment.

Thereby, it is advantageously possible to easily differentiate between different data connections of the target user equipment, e.g. in case that the charging within the telecommunications network is dependent whether data packets regarding a first data connection of the target user equipment are transmitted, or data packets regarding a second data connection of the target user equipment are transmitted.

According to the present invention, it is furthermore preferred that in case that the data connection—established between the telecommunications network and the target user equipment is released while the target user equipment camps on the telecommunications network using the second base transceiver station, the second non-delivered packet data volume information is transmitted to the core network of the telecommunications network, preferably as part of a user equipment context release complete message.

Furthermore, the present invention relates to a (first) base transceiver station for improving charging information accuracy in a telecommunications network with respect to a target user equipment, wherein the telecommunications network comprises a core network, the base transceiver station and a second base transceiver station, wherein the base transceiver station is configured to provide data traffic to the target user equipment in the form of data packets, the data traffic being related to a data connection established between the telecommunications network and the target user equipment, wherein in case that the target user equipment camps on the telecommunications network using the base transceiver station, the base transceiver station comprises a first non-delivered packet data volume information, the first non-delivered packet data volume information being specific to the target user equipment and related to data packets to be sent to the target user equipment but unsuccessfully transmitted by the base transceiver station to the target user equipment, wherein in case that the target user equipment camps on the telecommunications network using the second base transceiver station, the second base transceiver station comprises a second non-delivered packet data volume information, the second non-delivered packet data volume information being specific to the target user equipment and related to data packets to be sent to the target user equipment but unsuccessfully transmitted by the second base transceiver station to the target user equipment, wherein the base transceiver station is configured such that in case of a handover or cell change procedure from the base transceiver station to the second base transceiver station regarding the target user equipment, the first non-delivered packet data volume information is transmitted from the base transceiver station to the second base transceiver station, the first non-delivered packet data volume information being transmitted by means of using at least one out of the following:
- an X2 interface between the base transceiver station and the second base transceiver station,
- an S1 interface between the base transceiver station and the core network and the S1 interface between the core network and the second base transceiver station,
- user equipment history information regarding the target user equipment.

Additionally, the present invention relates to a (second) base transceiver station for improving charging information accuracy in a telecommunications network with respect to a target user equipment, wherein the telecommunications network comprises a core network, a first base transceiver station and the base transceiver station, wherein the first base transceiver station is configured to provide data traffic to the target user equipment in the form of data packets, the data traffic being related to a data connection established between the telecommunications network and the target user equipment, wherein in case that the target user equipment camps on the telecommunications network using the first base transceiver station, the first base transceiver station comprises a first non-delivered packet data volume information, the first non-delivered packet data volume information being specific to the target user equipment and related to data packets to be sent to the target user equipment but unsuccessfully transmitted by the first base transceiver station to the target user equipment, wherein in case that the target user equipment camps on the telecommunications network using the base transceiver station, the base transceiver station comprises a second non-delivered packet data volume information, the second non-delivered packet data volume information being specific to the target user equipment and related to data packets to be sent to the target user equipment but unsuccessfully transmitted by the base transceiver station to the target user equipment, wherein the base transceiver station is configured such that in case of a handover or cell change procedure from the first base transceiver station to the base transceiver station regarding the target user equipment, the first non-delivered packet data volume information is transmitted from the first base transceiver station to the base transceiver station and is taken into account for determining the second non-delivered packet data volume information, the first non-delivered packet data volume information being transmitted by means of using at least one out of the following:

an X2 interface between the base transceiver station and the second base transceiver station, an S1 interface between the base transceiver station and the core network and the S1 interface between the core network and the second base transceiver station, user equipment history information regarding the target user equipment.

It is furthermore preferred according to the present invention also with respect to the base transceiver station that the base transceiver station is configured such that in case that the data connection established between the telecommunications network and the target user equipment is released while the target user equipment camps on the telecommunications network using the base transceiver station, the second (i.e. aggregated) non-delivered packet data volume information is transmitted to the core network of the telecommunications network, preferably as part of a user equipment context release complete message.

It is furthermore preferred according to the present invention also with respect to the base transceiver station that data packets to be sent to the target user equipment but unsuccessfully transmitted by the base transceiver station relate to user plane data volume.

Additionally, the present invention relates to a telecommunications network for improving charging information accuracy with respect to a target user equipment, wherein the telecommunications network comprises a core network, a first base transceiver station and a second base transceiver station, wherein the target user equipment receives data traffic from the core network in the form of data packets, the data traffic being related to a data connection established between the target user equipment and the telecommunications network, wherein in case that the target user equipment camps on the telecommunications network using the first base transceiver station, the first base transceiver station comprises a first non-delivered packet data volume information, the first non-delivered packet data volume information being specific to the target user equipment and related to data packets to be sent to the target user equipment but unsuccessfully transmitted by the first base transceiver station to the target user equipment, wherein in case that the target user equipment camps on the telecommunications network using the second base transceiver station, the second base transceiver station comprises a second non-delivered packet data volume information, the second non-delivered packet data volume information being specific to the target user equipment and related to data packets to be sent to the target user equipment but unsuccessfully transmitted by the second base transceiver station to the target user equipment, wherein the telecommunications network is configured such that in case of a handover or cell change procedure from the first base transceiver station to the second base transceiver station regarding the target user equipment, the first non-delivered packet data volume information is transmitted from the first base transceiver station to the second base transceiver station and is taken into account for determining the second non-delivered packet data volume information, the first non-delivered packet data volume information being transmitted by means of using at least one out of the following:

an X2 interface between the first base transceiver station and the second base transceiver station, an S1 interface between the first base transceiver station and the core network and the S1 interface between the core network and the second base transceiver station, user equipment history information regarding the target user equipment.

Thereby, it is advantageously possible according to the present invention that with such a telecommunications network, an improved charging information accuracy can be obtained.

Furthermore, it is preferred according to the present invention also with respect to the telecommunications network that the first non-delivered packet data volume information counts the undelivered data packet volume from the first base transceiver station to the target user equipment, and wherein the second non-delivered packet data volume information counts the undelivered data packet volume from the second base transceiver station to the target user equipment, wherein the second non-delivered packet data volume information preferably corresponds to or comprises the aggregated data volume of the undelivered data packet volume from the first base transceiver station to the target user equipment, and the undelivered data packet volume from the second base transceiver station to the target user equipment.

Additionally, it is preferred according to the present invention also with respect to the telecommunications network that the telecommunications network is configured such that in case that the data connection established between the telecommunications network and the target user equipment is released while the target user equipment camps on the telecommunications network using the second base transceiver station, the second (i.e. aggregated) non-delivered packet data volume information is transmitted to the core network of the telecommunications network, preferably as part of a user equipment context release complete message.

Additionally, the present invention relates to a program comprising a computer readable program code which, when executed on a computer or on a base transceiver station or on a network component of a telecommunications network, causes the computer or the base transceiver station or the network component of the telecommunications network to perform the inventive method.

Still additionally, the present invention relates to computer program product for using a machine type communication device with a mobile communication network, the computer program product comprising a computer program stored on a storage medium, the computer program comprising program code which, when executed on a computer or on a base transceiver station or on a network component of a telecommunications network, causes the computer or the base transceiver station or the network component of the telecommunications network to perform the inventive method.

These and other characteristics, features and advantages of the present invention will become apparent from the following detailed description, taken in conjunction with the accompanying drawings, which illustrate, by way of example, the principles of the invention. The description is given for the sake of example only, without limiting the scope of the invention. The reference figures quoted below refer to the attached drawings.

The present invention will be described with respect to particular embodiments and with reference to certain drawings but the invention is not limited thereto but only by the claims. The drawings described are only schematic and are non-limiting. In the drawings, the size of some of the elements may be exaggerated and not drawn on scale for illustrative purposes.

Where an indefinite or definite article is used when referring to a singular noun, e.g. "a", "an", "the", this includes a plural of that noun unless something else is specifically stated.

Furthermore, the terms first, second, third and the like in the description and in the claims are used for distinguishing between similar elements and not necessarily for describing a sequential or chronological order. It is to be understood that the terms so used are interchangeable under appropriate circumstances and that the embodiments of the invention described herein are capable of operation in other sequences than described or illustrated herein.

In FIG. 1, a telecommunications network 10, especially a mobile communication network 10 such as a public land mobile network 10, is schematically shown, the telecommunications network 10 comprising an access network 16 and a core network 15. The core network 15 is only schematically shown by means of a cloud representation. The telecommunications network 10 is preferably a cellular telecommunications network 10 comprising typically a plurality of network cells, two of which are represented in FIG. 1 by means of a solid line and reference signs 11' and 12'. In the telecommunications network 10, typically a plurality of user equipments are camping on the telecommunications network 10 within the network cells 11', 12', i.e. the user equipments are connected or are camping on a first base transceiver station 11, the first base transceiver station 11 serving the radio cell 11', or on a second base transceiver station 12, the second base transceiver station 12 serving the radio cell 12'. The first and second base transceiver stations 11, 12 are typically base transceiver stations, e.g. an eNodeB in case of LTE.

In the context of the present invention, it is particularly interesting if a user equipment, hereinafter also called the target user equipment 20, changes the cell (i.e. changes in the example given from the first radio cell 11' to the second radio cell 12', which is equivalent to changing from camping on the telecommunications network 10 via the first base transceiver station 11 to camping on the telecommunications network 10 via the second base transceiver station 12), especially but not necessarily by means of a handover procedure or by means of another cell change mechanism. This case of a moving target user equipment 20 is particularly interesting because in case that the target user equipment 20 is stationary (e.g. with the first base transceiver station 11 or with the second base transceiver station 12), i.e. in case that the data connection is established between the target user equipment 20 and the telecommunications network 10 via (or using) the first base transceiver station 11 (or via the second base transceiver station 12), and the target user equipment 20 stays with that base transceiver station 11, 12 until the data connection is terminated, in order to collect the non-delivered packet data volume, the respective base transceiver station 11, 12 only needs to track or to determine the non-delivered packet data volume and—after completion of the packet data session—report it to the core network 15 of the telecommunications network 10 in view of using the information about the non-delivered packet data volume in order to improve the charging information accuracy within the telecommunications network 10.

The case of a moving target user equipment 20 is represented in FIG. 1 by means of an arrow and a target user equipment 20 shown with a dashed line to symbolize that the target user equipment 20 is camping, at a first point in time, on the telecommunications network 10 via the first base transceiver station 11 (i.e. being located in the first radio cell 11'), and is camping, at a second point in time (subsequent compared to the first point in time), on the telecommunications network 10 via the second base transceiver station 12 (i.e. being located in the second radio cell 12').

Figure 2:
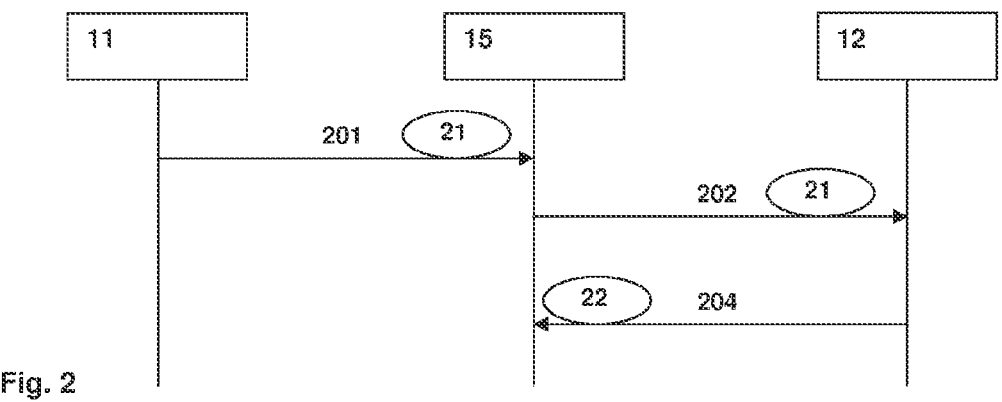
FIGS. 2 and 3 schematically illustrate the general communication diagrams according to the present invention between the first and second base transceiver stations and the core network of the telecommunications network in case of a handover procedure or a cell change of the target user equipment.
Figure 3:
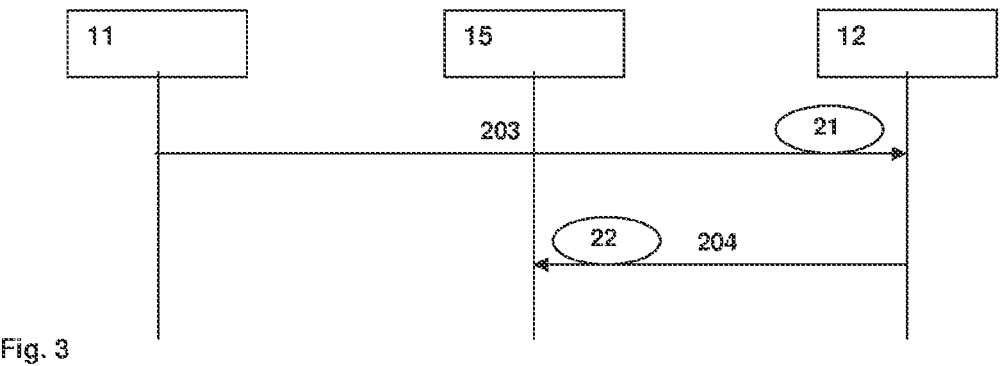

In FIGS. 2 and 3, the general communication diagrams according to the present invention between the first base transceiver station 11, the second base transceiver station 12, and the core network 15 are schematically shown for the situation illustrated in FIG. 1, i.e. with the target user equipment 20 being first connected to the telecommunications network 10 via the first base transceiver station 11 and subsequently moving to the second base transceiver station 12, i.e. moving from the first radio cell 11' of the telecommunications network 10 to the second radio cell 12' of the telecommunications network 10.

According to the present invention (cf. FIG. 2), during an established data connection (or an established packet data session) with the first base transceiver station 11, and in case that a handover procedure or a cell change procedure is to be executed, a first non-delivered packet data volume information 21 is transmitted—by means of a first message 201—to the core network 15. Furthermore, the first non-delivered packet data volume information 21 is transmitted—by means of a second message 202—from the core network 15 to the second base transceiver station 12. By means of a fourth message 204, a second non-delivered packet data volume information 22 is transmitted from the second base transceiver station 12 to the core network 15 in case that either the data connection or the packet data session is terminated, or a subsequent handover procedure or a cell change procedure (to another base transceiver station (not shown in the figures)) is initiated due to moving of the target user equipment 20 to the radio cell of that other base transceiver station.

According to the present invention, the second non-delivered packet data volume information 22 corresponds to the aggregated non-delivered packet data volume of the target user equipment 20 up to the respective point in time. In the first case of a termination of the data connection or the packet data session between the telecommunications network 10 and the target user equipment 20, the second non-delivered packet data volume information 22 is reported to the core network 15 for (improved) charging purposes. In the second case of a handover procedure or a cell change procedure to another base transceiver station, relative to that other base transceiver station, the second base transceiver station 12 takes the roll of the first base transceiver station 11 and that other base transceiver station takes the roll of the second base transceiver station 12 in the sense of the terminology of the present invention. This also means that the transmission of the second non-delivered packet data volume information 22 towards the core network 15 (by means of the fourth message 204) corresponds (in the relation between the second base transceiver station 12 and that other (subsequent) base transceiver station) to the transmission of the first non-delivered packet data volume information 21.

According to an alternative embodiment of the present invention (cf. FIG. 3), also during an established data connection (or an established packet data session) with the first base transceiver station 11, and in case that a handover procedure or a cell change procedure is to be executed, the first non-delivered packet data volume information 21 is transmitted—by means of a third message 203—to the second base transceiver station 12. By means of the fourth message 204, the second non-delivered packet data volume information 22 is transmitted

- from the second base transceiver station 12 to the core network 15 in case that the data connection or the packet data session is terminated, or
- from the second base transceiver station 12 to another base transceiver station (not depicted) in case that a subsequent handover procedure or a cell change procedure (to the other base transceiver station (not shown in the figures)) is initiated due to moving of the target user equipment 20 to the radio cell of that other base transceiver station.

Also according to the alternative embodiment of the present invention, the second non-delivered packet data volume information 22 corresponds to the aggregated non-delivered packet data volume of the target user equipment 20 up to the respective point in time. In the first case of a termination of the data connection or the packet data session between the telecommunications network 10 and the target user equipment 20, the second non-delivered packet data volume information 22 is reported to the core network 15 for (improved) charging purposes. In the second case of a handover procedure or a cell change procedure to another base transceiver station, relative to that other base transceiver station, the second base transceiver station 12 takes the roll of the first base transceiver station 11 and that other base transceiver station takes the roll of the second base transceiver station 12 in the sense of the terminology of the present invention. This also means that the transmission of the second non-delivered packet data volume information 22 (by means of the fourth message 204) corresponds (in the relation between the second base transceiver station 12 and that other (subsequent) base transceiver station) to the transmission of the first non-delivered packet data volume information 21 and occurs towards the other base transceiver station (in a manner analogous to the third message 203).

According to the present invention, it is furthermore preferred that in a first phase, the target user equipment 20 is allowed to report the non-delivered packet data volume to the telecommunications network 10. This is especially realised by means of a per user equipment activation of this possibility, i.e. the activation of the reporting functionality can be switched on or off for each (target) user equipment such that reporting towards the core network 15 of unsuccessfully transmitted down link user plane data volume is enabled or not. This is, e.g., done by means of an initial message, from an entity of the core network 15 like the MME (Mobility Management Entity) in LTE, to instruct the access network 16 that the reporting functionality should be activated (or not), i.e. the counting (and aggregation) of unsuccessfully transmitted down link user plane data volumes for a particular (target) user equipment 20 be activated (or not). This can, e.g., be done via an additional information element (IE) in the INITIAL CONTEXT SETUP REQUEST information element on the S1 interface in an LTE network. However, an alternative method to generally enable counting of unsuccessfully transmitted down link user plane data volumes in the network would be a configuration by an Operation & Maintenance (O&M) component, i.e. typically for a larger group of (target) user equipments.

Once the base transceiver station 11, 12 later on receives data to be forwarded to the target user equipment 20 via the air interface, the base transceiver station 11, 12 counts the arrived user plane data volume for the target user equipment 20 on the backhaul interface (S1 interface), and compares it with the successfully transmitted user plane data volume on the air interface towards the target user equipment 20. The difference between user plane data volume arrived on the backhaul and user plane data volume successfully transmitted on the air interface, corresponds to the unsuccessfully transmitted down link user plane data volume, subject to be reported in a later stage. With regard to the first base transceiver station 11 this unsuccessfully transmitted down link user plane data volume is aggregated when determining the first non-delivered packet data volume information 21, and with regard to the second base transceiver station 12 this unsuccessfully transmitted down link user plane data volume is aggregated when determining the second non-delivered packet data volume information 22.

In case the target user equipment 20 starts moving towards another base transceiver station (i.e. from the first base transceiver station 11 to the second base transceiver station 12, or from the first radio cell 11' to the second radio cell 12'), the target user equipment 20 will be handed over from the source base transceiver station (first base transceiver station 11), towards the target base transceiver station (second base transceiver station 12). In order to build up (or aggregate) an information which is up to date and correct at each given point in time about the aggregated unsuccessfully transmitted down link user plane data volume of a particular target user equipment 20, the information about recently generated (aggregated) unsuccessfully transmitted down link user plane data volume of the source base transceiver station (first base transceiver station 11) need to be made available in the target cell too, i.e. to the second base transceiver station 12. According to the present invention, this is provided for by using the possibility to piggy back the information about unsuccessfully transmitted down link user plane data volume in the source base transceiver station (i.e. the first non-delivered packet data volume information 21 of the first base transceiver station 11), on top of the hand over signalling to the target base transceiver station (i.e. the second base transceiver station 12).

As in LTE, two different intra LTE hand over mechanisms are supported, in order to enable a forwarding of the information about the previously unsuccessfully transmitted down link user plane data volume (i.e. the forwarding of the first non-delivered packet data volume information 21) in all hand over cases or cell change situations, two different cases need to be distinguished:

In case of a so called X2 hand over, the information about the previously unsuccessfully transmitted down link user plane data volume (i.e. the first non-delivered packet data volume information 21) need to be added in the HAN- DOVER REQUEST message (third message 203) from the source eNodeB (first base transceiver station 11) to the target eNodeB (second base transceiver station 12) on the X2 interface.

In case of a so called S1 hand over (or cell change), the information about the previously unsuccessfully transmitted down link user plane data volume (i.e. the first non-delivered packet data volume information 21) need to be added in the Source to Target Transparent Container being included in the HANDOVER REQUIRED message (first message 201) from the source eNodeB (first base transceiver station 11) towards the MME (core network 15) and in the HANDOVER REQUEST message (second message 202) from the MME (core network 15) towards the target eNodeB (second base transceiver station 12) on the S1 interface.

An alternatively solution to transmit the first non-delivered packet data volume information 21 to the second base transceiver station 12 according to the present invention is to add the information about the previously unsuccessfully transmitted down link user plane data volume (i.e. the first non-delivered packet data volume information 21) in the UE History information. If supported, the UE history information allows forwarding of information from a source-eNodeB (first base transceiver station 11) to the target-eNodeB (second base transceiver station 12) in a transparent way, regardless of the hand over type used in LTE.

Once the target user equipment 20 has been handed over to the target base transceiver station (second base transceiver station 12), the (second) base transceiver station 12 shall use the information about the previously unsuccessfully transmitted down link user plane data volume (i.e. the first non-delivered packet data volume information 21) received from the source (first) base transceiver station 11, to further calculate the aggregated unsuccessfully transmitted down link user plane data volume (i.e. to calculate (or aggregate) the second non-delivered packet data volume information 22, i.e. in case the target (second) base transceiver station 12 again receives data to be forwarded to the target user equipment 20 via the air interface, the target (second) base transceiver station 12 can now add any newly observed unsuccessfully transmitted down link user plane data volume values to the previously received unsuccessfully transmitted down link user plane data volume values from the previous base transceiver station(s) (transmitted via the first non-delivered packet data volume information 21).

As a result of the inventive method as well as with the inventive base transceiver station and telecommunications network 10, the base transceiver station, the target user equipment 20 is associated with at a given moment in time is holding the current aggregated unsuccessfully transmitted down link user plane data volume information for the time the (data) connection has been set up until the target user equipment 20 terminates the (data) connection. In case the UE is handed over to another base transceiver station the whole process will start again.

In case the UE stops the transmission or releases the connection, one of the last messages from the (first or second) base transceiver station 11, 12 to the core network 15 can be used to transmit the total aggregated unsuccessfully transmitted down link user plane data volume to the core network 15 for further processing. In case of LTE e.g. the UE CONTEXT RELEASE COMPLETE message can be used to transmit the total aggregated unsuccessfully transmitted down link user plane data volume from the respective eNodeB (or base transceiver station 11, 12) to the MME, i.e. the core network 15.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

The invention claimed is:

1. A method for improving charging information accuracy in a telecommunications network with respect to a target user equipment, wherein the telecommunications network comprises a core network, a first base transceiver station and a second base transceiver station, the method comprising:
   in case of a handover or cell change procedure when the target user equipment moves from the first base transceiver station to the second base transceiver station, receiving, by the second base transceiver station, a first non-delivered packet data volume information from the first base transceiver station via at least one of the following:
      an X2 interface between the first base transceiver station and the second base transceiver station, and
      an S1 interface between the first base transceiver station and the core network and the S1 interface between the core network and the second base transceiver station; and
   determining, by the second base transceiver station, based on the first non-delivered packet data volume information, a second non-delivered packet data volume information;
   wherein the first non-delivered packet data volume information and the second non-delivered packet data volume information relate to data packets to be sent to the target user equipment that are not successfully transmitted to the target user equipment.

2. The method according to claim 1, wherein the first non-delivered packet data volume information is transmitted as part of: a handover request message from the first base transceiver station to the second base transceiver station and/or a handover required message from the first base transceiver station to the core network.

3. The method according to claim 1, wherein data packets to be sent to the target user equipment but unsuccessfully transmitted by the first and/or the second base transceiver station relate to user plane data volume.

4. The method according to claim 1, wherein the first non-delivered packet data volume information counts the undelivered data packet volume from the first base transceiver station to the target user equipment, and wherein the second non-delivered packet data volume information counts the undelivered data packet volume from the second base transceiver station to the target user equipment.

5. The method according to claim 1, wherein the first non-delivered packet data volume information and the second non-delivered packet data volume information are specific to the data connection established between the telecommunications network and the target user equipment.

6. The method according to claim 1, wherein in case that the data connection established between the telecommunications network and the target user equipment is released while the target user equipment camps on the telecommunications network using the second base transceiver station, the second non-delivered packet data volume information is transmitted to the core network of the telecommunications network.

7. A telecommunications network for improving charging information accuracy with respect to a target user equipment, wherein the telecommunications network comprises:
   a core network;
   a first base transceiver station; and
   a second base transceiver station;
   wherein the first base transceiver station is configured, in case of a handover or cell change procedure when the target user equipment moves from the first base transceiver station to the second base transceiver station, to transmit the first non-delivered packet data volume information to the second base transceiver station using at least one out of the following:
      an X2 interface between the first base transceiver station and the second base transceiver station, and
      an S1 interface between the first base transceiver station and the core network and the S1 interface between the core network and the second base transceiver station;
   wherein the second base transceiver station is configured to determine, based on the first non-delivered packet data volume information, a second non-delivered packet data volume information;
   wherein the first non-delivered packet data volume information and the second non-delivered packet data volume information relate to data packets to be sent to the target user equipment that are not successfully transmitted to the target user equipment.

8. The telecommunications network according to claim 7, wherein the first non-delivered packet data volume information counts the undelivered data packet volume from the first base transceiver station to the target user equipment, and wherein the second non-delivered packet data volume information counts the undelivered data packet volume from the second base transceiver station to the target user equipment.

9. The telecommunications network according to claim 7, wherein the telecommunications network is configured such that in case that the data connection established between the telecommunications network and the target user equipment is released while the target user equipment camps on the telecommunications network using the second base transceiver station, the second non-delivered packet data volume information is transmitted to the core network of the telecommunications network.

10. A tangible, non-transitory processor-readable medium having processor-executable instructions stored thereon for improving charging information accuracy in a telecommunications network with respect to a target user equipment, wherein the telecommunications network comprises a core network, a first base transceiver station and a second base transceiver station, wherein the processor-executable instructions, when executed by a processor, facilitate performance of the following:
   in case of a handover or cell change procedure when the target user equipment moves from the first base transceiver station to the second base transceiver station, receiving, by the second base transceiver station, a first non-delivered packet data volume information from the first base transceiver station via at least one of the following:
      an X2 interface between the first base transceiver station and the second base transceiver station, and
      an S1 interface between the first base transceiver station and the core network and the S1 interface between the core network and the second base transceiver station; and
   determining, by the second base transceiver station, based on the first non-delivered packet data volume information, a second non-delivered packet data volume information;
wherein the first non-delivered packet data volume information and the second non-delivered packet data volume information relate to data packets to be sent to the target user equipment that are not successfully transmitted to the target user equipment.

* * * * *